US012142835B2

(12) United States Patent
Ji et al.

(10) Patent No.: US 12,142,835 B2
(45) Date of Patent: Nov. 12, 2024

(54) ANTENNA DEVICE

(71) Applicant: KMW INC., Hwaseong-si (KR)

(72) Inventors: Kyo Sung Ji, Hwaseong-si (KR); Bae Mook Jeong, Suwon-si (KR); Joung Hoe Kim, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 168 days.

(21) Appl. No.: 17/992,916

(22) Filed: Nov. 22, 2022

(65) Prior Publication Data

US 2023/0085969 A1 Mar. 23, 2023

Related U.S. Application Data

(63) Continuation of application No. PCT/KR2021/006488, filed on May 25, 2021.

(30) Foreign Application Priority Data

May 25, 2020 (KR) ........................ 10-2020-0062576
May 25, 2021 (KR) ........................ 10-2021-0066748

(51) Int. Cl.
*H01Q 21/00* (2006.01)
*H01Q 1/48* (2006.01)
(Continued)

(52) U.S. Cl.
CPC ........... *H01Q 21/0075* (2013.01); *H01Q 1/48* (2013.01); *H01Q 1/526* (2013.01); *H01Q 9/045* (2013.01); *H01Q 21/065* (2013.01)

(58) Field of Classification Search
CPC ........... H01Q 21/0006; H01Q 21/0075; H01Q 1/246; H01Q 1/52; H01Q 1/526
See application file for complete search history.

(56) References Cited

U.S. PATENT DOCUMENTS 6,048,212 A * 4/2000 Stauble ................ H01R 12/721 439/63
11,837,789 B2 * 12/2023 Da Silveira ............... H01P 7/06
(Continued)

FOREIGN PATENT DOCUMENTS

CN 206673115 U 11/2017
JP 2001-313581 A 11/2001
(Continued)

OTHER PUBLICATIONS

International Search Report mailed Sep. 2, 2021 for International Application No. PCT/KR2021/006488 and its English translation.
(Continued)

*Primary Examiner* — Jason M Crawford
(74) *Attorney, Agent, or Firm* — Insight Law Group, PLLC; Seung Lee

(57) ABSTRACT

The present invention relates to an antenna device and, particularly, the antenna device comprises: a printed board assembly (hereinafter, referred to as “PBA”) having a plurality of antenna-related components mounted on one surface thereof, and having a plurality of filters mounted on the other surface thereof, an antenna board which is arranged to be stacked on one surface side of the PBA, and which has a plurality of antenna elements mounted on one surface thereof and connected to construct electrical signal lines with the filters in close contact with the other surface thereof, and clamshell units interposed between the other surface of the PBA and one surface of the filters to perform a signal shielding function, wherein the insides of the clamshell units include strip line connectors which absorb the assembly tolerance between the clamshell units while being partially deformed by means of the adhesion of the filters during close-coupling of the filters, and which shield a signal by means of ground surfaces arranged around the strip line connector while constructing the electrical signal
(Continued)

lines, and thus the manufacturing cost of the filters is reduced and impedance properties are prevented from being easily disrupted.

10 Claims, 10 Drawing Sheets

(51) Int. Cl.

| | |
|---|---|
| ***H01Q 1/52*** | (2006.01) |
| ***H01Q 9/04*** | (2006.01) |
| ***H01Q 21/06*** | (2006.01) |

(56) References Cited

U.S. PATENT DOCUMENTS

| | | | | |
|---|---|---|---|---|
| 2018/0316086 | A1 | 11/2018 | Lehman et al. | |
| 2020/0028237 | A1* | 1/2020 | Kim | H01Q 1/02 |
| 2021/0249752 | A1* | 8/2021 | Yoo | H04B 1/0078 |
| 2022/0200125 | A1* | 6/2022 | Ji | H05K 7/20127 |
| 2023/0085969 | A1* | 3/2023 | Ji | H01Q 21/0075 343/893 |
| 2023/0087435 | A1* | 3/2023 | Ji | H01Q 1/02 343/841 |
| 2023/0299456 | A1* | 9/2023 | Kim | H01Q 1/48 343/834 |

FOREIGN PATENT DOCUMENTS

| | | | |
|---|---|---|---|
| JP | 2019-536362 | A | 12/2019 |
| KR | 10-2013-0079213 | A | 7/2013 |
| KR | 10-2014-0126204 | A | 10/2014 |
| KR | 2019-0118979 | A | 10/2019 |
| KR | 10-2019-0126336 | A | 11/2019 |
| KR | 10-2020-0049620 | A | 5/2020 |
| WO | 2019-240489 | A | 12/2019 |
| WO | 2020-091329 | A | 5/2020 |

OTHER PUBLICATIONS

Notice of Allowance mailed Aug. 25, 2022 from the Korean Intellectual Property Office for Korean Application No. 10-2021-0066748.

Non-final Office Action mailed on Jan. 23, 2024 from the Japanese Patent Office for Japanese Application No. 2022-572321.

* cited by examiner

ANTENNA DEVICE

CROSS-REFERENCE TO RELATED APPLICATIONS

This application is a continuation application of International Application No. PCT/KR2021/006488, filed May 25, 2021, which claims the benefit of Korean Patent Application Nos. 10-2020-0062576, filed May 25, 2020; and 10-2021-0066748, filed May 25, 2021, in the Korean Intellectual Property Office, the disclosures of which are incorporated herein in their entirety by reference.

TECHNICAL FIELD

The present disclosure relates to an antenna device, and more particularly, to an antenna device which can simplify the constitution of a filter by providing a strip line connector inside a clamshell part instead of installing a radio frequency (RF) connector in the filter.

BACKGROUND ART

A wireless communication technology, for example, a multiple-input multiple-output (MIMO) technology is a technology which can dramatically increase data transmission capacity by using a plurality of antennas, and in this technology, a transmitter transmits different data through respective transmission antennas, and a receiver adopts a spatial multiplexing technique to separate pieces of transmitted data through proper signal processing.

Accordingly, with the simultaneous increase of the number of transmission/reception antennas, the channel capacity is increased, and thus more data can be transmitted. For example, in case that the number of antennas is increased to 10, about 10 times channel capacity can be secured by using the same frequency band as compared with the current single antenna system. In case of a transmission/reception device to which such a MIMO technology is applied, the number of transmitters and filters can also be increased as the number of antennas is increased.

FIG. 1 is an exploded perspective view and a partial enlarged view of a plurality of layers of a MIMO antenna device in the related art, and FIG. 2 is a perspective view and a partial cross-sectional view illustrating a filter assembly between a related PCB board and an antenna substrate among constitutions of FIG. 1.

Referring to FIGS. 1 and 2, an example of a MIMO antenna device 1 in the related art includes a main housing 10 having one side being opened and provided with a specific installation space and the other side being shielded and integrally formed with a plurality of heat dissipation pins 15, a print board assembly (hereinafter, abbreviated to "PBA") 30 primarily stacked inside an installation space of the main housing 10, and having the other surface on which first antenna-related components (not illustrated) are mounted and one surface on which a plurality of filters 40 are mounted to interpose clamshells 50 between the filters, and an antenna board 60 secondarily stacked inside the installation space of the main housing 10, and having the other surface connected to construct specific electrical signal lines with the filters 40 of the PBA 30 and one surface on which a plurality of antenna elements 65 are mounted.

Here, the filter 40 may be adopted as any one of a cavity filter, a waveguide filter, and a dielectric filter. In addition, the filter 40 does not exclude a multi-band filter (MBF) that covers a multi-frequency band.

Further, the clamshell 50 is interposed between the PBA 30 and the filter 40 and performs a signal shielding function by shielding electromagnetic waves between the filter and other antenna-related components mounted on the PBA 30 so as not to exert an influence on the electrical signal line constructed in the filter 40.

However, on the point that the PBA 30 and the filter 40 should be provided to energize each other, as being referenced in FIG. 1, at least one case extension part 45 may be provided on the filter 40, and at least one through-hole 55 that is penetrated by the case extension part 45 may be formed on the clamshell 50.

Here, as illustrated in FIG. 2, an RF connector 43 is built in to penetrate an inside of the case extension part 45 of the filter 40, and the PBA 30 and the filter 40 are electrically connected to each other via a radio frequency (RF) connector 43.

However, the example of the antenna device 1 in the related art has a problem in that impedance characteristics of an interior impedance matching space are easily disrupted in installing and fixing the RF connector 43 to the inside of the case extension part 45.

Further, the example of the antenna device 1 in the related art has a problem of high manufacturing costs because the structure of the RF connector 43 is very complicated, and the RF connector 43 is fixed to the side of the filter 40.

DISCLOSURE

Technical Problem

In order to solve the above problems, an aspect of the present disclosure is to provide an antenna device which can simplify the constitution of a multi-band filter by providing a strip line connector having a simple structure inside a clamshell part instead of installing an RF connector in the filter.

Another aspect of the present disclosure is to provide an antenna device which can secure a more stable filter performance by constituting ground shielding lines inside and outside a clamshell part.

The technical problems of the present disclosure are not limited to the above-described technical problems, and other unmentioned technical problems may be clearly understood by those skilled in the art from the following descriptions.

Technical Solution

In one embodiment of the present disclosure, an antenna device includes: a printed board assembly (hereinafter, abbreviated to "PBA") having one surface on which a plurality of antenna-related components are mounted and the other surface on which a plurality of filters are mounted; an antenna board disposed to be stacked on one surface side of the PBA, mounted with a plurality of antenna elements on one surface of the antenna board, and connected to construct electrical signal lines with the filters in close contact with the other surface of the antenna board; and a clamshell part interposed between the other surface of the PBA and one surface of the filters and configured to perform a signal shielding function, wherein in an inside of the clamshell part, a strip line connector is provided to absorb an assembly tolerance between the clamshell parts while being partially deformed by means of an adhesion of the filters during close coupling of the filters, and to shield a signal by means of a ground surface disposed around the strip line connector while constructing the electrical signal lines.

Here, the strip line connector may be connected to the other surface of the PBA so as to be grounded by the ground surface provided in a form in which a signal shielding material is coated on an inner surface of the clamshell part and the other surface of the PBA.

Further, the strip line connector may be provided on the clamshell part, and one side thereof may be shielded by the PBA, and the other side thereof may be provided in a signal line connection space that is shielded by the filters.

Further, a signal shielding material may be provided to be coated on an inner wall surface of the signal line connection space so as not to be energized with the strip line connector.

Further, the signal shielding material coated on the inner wall surface of the signal line connection space may be configured to serve as a ground around the strip line connector.

Further, the strip line connector may include: a first contact panel being contact-fixed horizontally to the other surface of the PBA; a second contact panel disposed in parallel to the first contact panel so as to be in contact with the filters; and a connection panel configured to connect ends of the first contact panel and the second contact panel with each other.

Further, the strip line connector may be made of a conductive material, and may be formed to be elastically deformable.

Further, a pin through-hole that communicates with the signal line connection space may be formed on a region that is in close contact with the filters on the clamshell part, and an end part of a pressure terminal pin that is in pressure contact with the second contact panel on the strip line connector may be fixed to the filters while penetrating the pin through-hole.

Further, the pressure terminal pin may be fixedly mounted on a contact surface of the filters in a soldering joining method.

Further, an elastic ground washer electrostatically shielding the electrical signal line and being elastically supported by the filter may be installed on one outer side surface of the clamshell part that comes in close contact with the filter.

Advantageous Effects

The antenna device according to an embodiment of the present disclosure can achieve various effects as follows.

First, by providing the strip line connector having the simple structure inside the clamshell part instead of installing the RF connector in the filter, the costs can be saved through simplification of the constitution of the filters.

Second, by constituting the ground shielding lines inside and outside the clamshell part, more stable filter performance can be secured.

The effects of the present disclosure are not limited to the above-described effects, and other unmentioned effects can be clearly understood by those skilled in the art from the appended claims.

[Explanation of symbols]

Figure 1:
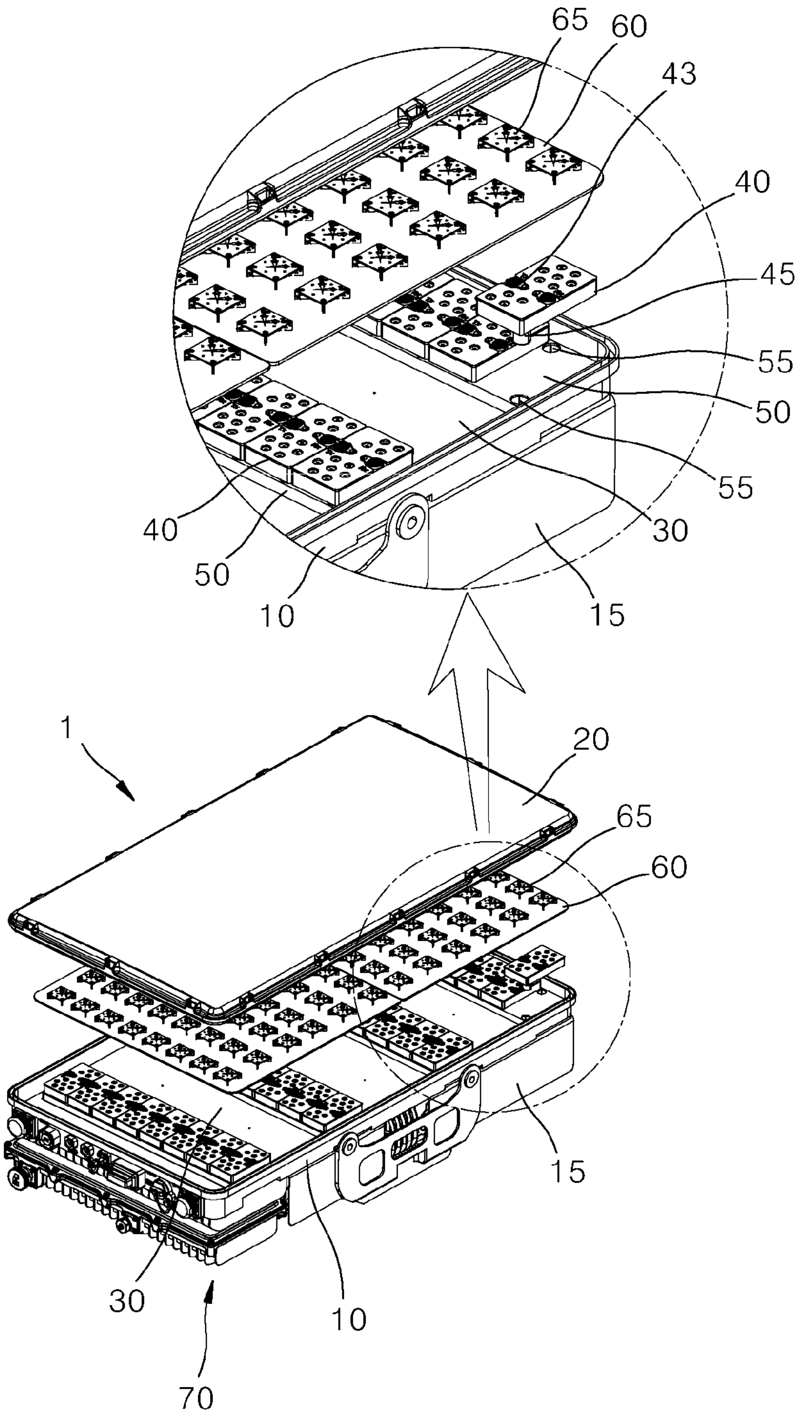
FIG. 1 is an exploded perspective view and a partial enlarged view illustrating a plurality of layers of a MIMO antenna device in the related art.

| | | | |
|---|---|---|---|
| 10: | main house | 15: | a plurality of heat dissipation pins |
| 60: | antenna board | 30: | printed board assembly (PBA) |
| 200: | filter | 210: | filter contact part |
| 211: | press-fit boss | 220: | pressure terminal pin |
| 300: | clamshell part | 305: | signal line connection space |
| 307: | ground surface | 310: | strip line connector |
| 311: | first contact panel | 312: | second contact panel |
| 313: | connection panel | 320: | elastic ground washer |

MODE FOR INVENTION

Hereinafter, an antenna device according to an embodiment of the present disclosure will be described in detail with reference to the exemplary drawings.

In adding reference numerals to constituent elements in the drawings, it is to be noted that the same constituent elements have the same reference numerals as much as possible even if they are represented in different drawings. Further, in explaining embodiments of the present disclosure, the detailed explanation of related known constitutions or functions will be omitted if it is determined that the detailed explanation interferes with understanding of the embodiments of the present disclosure.

The terms, such as "first, second, A, B, (a), and (b)", may be used to describe constituent elements of embodiments of the present disclosure. The terms are only for the purpose of discriminating one constituent element from another constituent element, but the nature, the turn, or the order of the corresponding constituent elements is not limited by the terms. Further, unless otherwise defined, all terms (including technical and scientific terms) used herein have the same meanings as those commonly understood by those ordinary skilled in the art to which the present disclosure belongs. The terms that are defined in a generally used dictionary should be interpreted as meanings that match with the meanings of the terms from the context of the related technology, and they are not interpreted as an ideal or excessively formal meaning unless clearly defined in the present disclosure.

Figure 3:
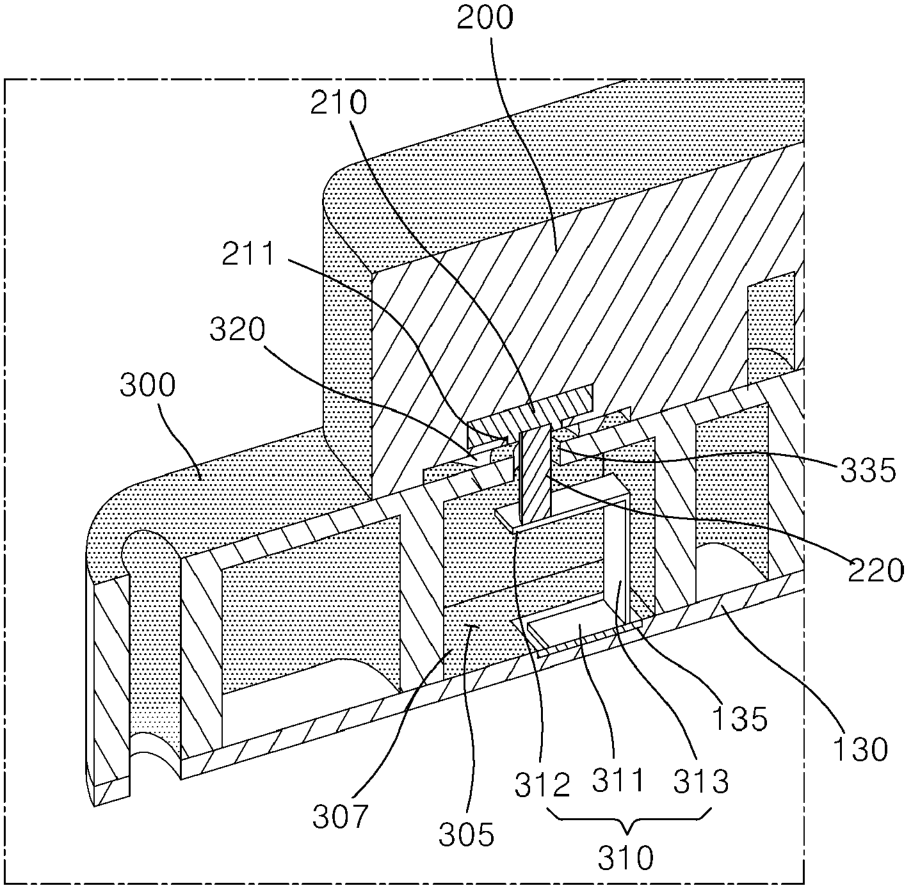
FIG. 3 is a cutaway perspective view illustrating partial installation of an antenna device according to an embodiment of the present disclosure.
Figure 4:
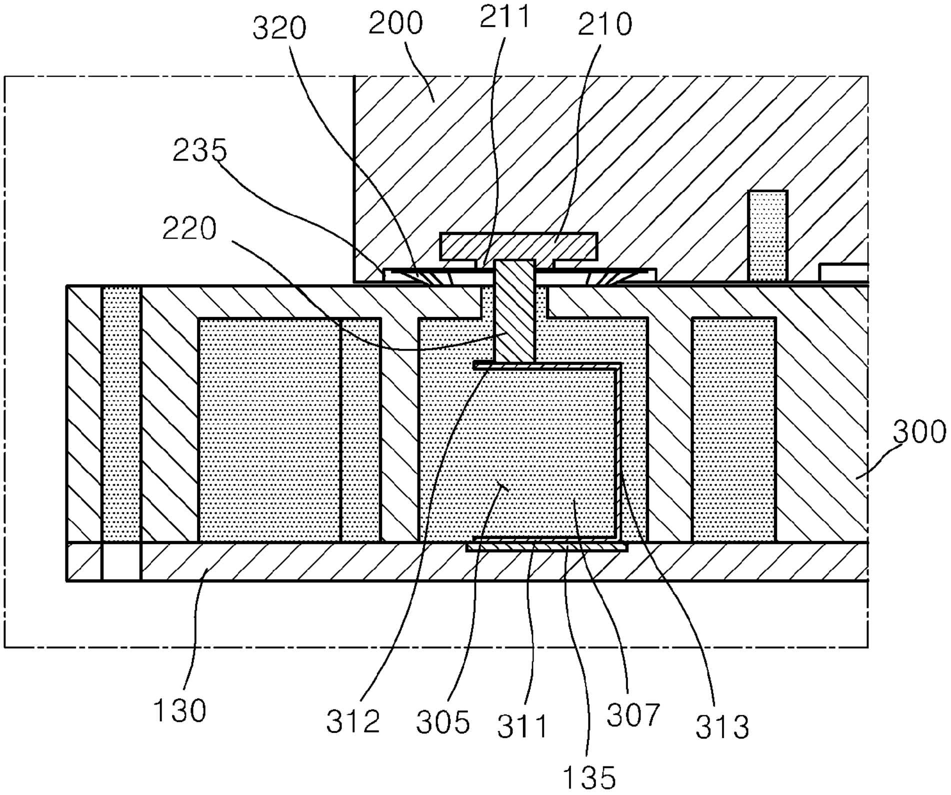
FIG. 4 is a cross-section view of FIG. 3.

FIG. 3 is a cutaway perspective view illustrating partial installation of an antenna device according to an embodiment of the present disclosure, and FIG. 4 is a cross-section view of FIG. 3.

An antenna device according to an embodiment of the present disclosure includes a printed board assembly (hereinafter, abbreviated to "PBA") 130 primarily stacked on an inside of an accommodation space of a main housing (refer to reference numeral 10 of FIG. 1) that forms the accommodation space open toward the front (upward in the drawing) and is in a cuboid shape having thin front and rear accommodation width elongated substantially in upward and downward directions, and at least one antenna board (refer to reference numeral 60 of FIG. 1) disposed to be secondarily stacked on the front (upward in FIG. 1) of the PBA 130.

Referring to FIG. 3, a plurality of antenna-related components (not illustrated) may be mounted on one surface (lower surface in the drawing) of the PBA 130, and a plurality of filters 200 may be mounted on the other surface (upper surface in the drawing). As referring to FIGS. 1 and 2, the antenna board 60 may be disposed to be stacked on the other surface (upper surface in the drawing) of the plurality of filters 200. Here, the filter 200 may be adopted as any one of a cavity filter, a waveguide filter, and a dielectric filter. In addition, the filter 200 does not exclude a multi-band filter that covers a multi-frequency band.

If a power is applied from a power supply unit assembly (hereinafter, abbreviated to "PSU assembly") (refer to reference numeral 70 of FIG. 1) provided on one side, the PBA 130 may serve to control the supplied power to be input to a plurality of antenna-related components and the filters 200 provided to perform the frequency filtering or to be output from the filters 200. Here, the plurality of antenna-related components may be electrical components related to a digital transceiver unit (DTU). Since it is expected that the plurality of antenna-related components generate significant heat when the power is driven, a plurality of heat dissipation pins (refer to reference numeral 15 of FIG. 1) that are integrally formed on one surface of the main housing 10 may be provided to directly dissipate heat rearward.

Meanwhile, as illustrated in FIG. 3, the filter 200 is a filtering device disposed between the PBA 130 and the antenna board 60 and configured to perform frequency filtering, and may perform the frequency filtering through specific electrical signal lines constructed between the PBA 130 and the antenna board 60.

Although not illustrated in the drawing, the filter 200 may filter only the frequency of a specific band by implementing attenuation characteristics (notch) through the usage of a filter body part provided with at least one cavity and a notch bar provided in the cavity. The implementation of the attenuation characteristic of the notch bar may be possible through a clearance control with a frequency tuning screw (not illustrated).

As illustrated in FIGS. 3 and 4, the antenna device according to an embodiment of the present disclosure may further include a clamshell part 300 interposed between the other surface of the PBA 130 and one surface of the filter 200 and configured to perform a signal shielding function. The clamshell part 300 may be a shield cover that shields the signal.

The PBA 130 and the filter 200 may construct an electrical signal line by penetrating the clamshell part 300. For this, a signal line connection space 305 may be provided in the clamshell part 300.

In the signal line connection space of the clamshell part 300, a strip line connector 310 may be provided. The strip line connector 310 may be provided in the signal line connection space 305, and one side of the strip line connector 310 may be connected to a contact part 135 of the PBA 130, and the other side thereof may be connected to a contact part 210 of the filter 200.

As illustrated in FIGS. 3 and 4, the strip line connector 310 is partially deformed by means of an adhesion of the filters 200 during close coupling of the filters 200, and serves to absorb an assembly tolerance between the clamshell parts 300 and to construct the electrical signal line.

Here, in an inside (e.g., signal line connection space 305) of the clamshell part 300, a ground surface 307 may be formed.

As illustrated in shades of gray in FIG. 3, the ground surface 307 may be provided in a manner that a signal shielding material is coated on an inner surface of the clamshell part 300 including an inner surface of the signal line connection space 305 and on the other surface corresponding to surroundings of the contact part 135 between one surface and the other surface of the PBA 130. Accordingly, the region of the strip line connector 310, which is connected to at least the other surface of the PBA 130 (contact part 135 to be described later), may be connected to be grounded by the ground surface 307.

However, the ground surface 307, as can be known from its constituent name, may serve as a ground terminal independent of the above-described electrical signal line, and the conductive material that is not energized with the strip line connector 310 may also be included in a coating of the signal shielding material that forms the above-described ground surface 307. As described above, the ground surface 307 provided by coating the signal shielding material on an inner wall surface of the signal line connection space 305 may serve as the ground around the strip line connector 310. This will be described in more detail later.

As illustrated in FIGS. 3 and 4, the strip line connector 310 may be provided in the signal line connection space 305 that is an inside of the clamshell part 300, and the signal line connection space 305 may be provided so that one side thereof is shielded by the PBA 130, and the other side thereof is shielded by the filters. However, it should be noted that the signal line connection space 305 that is formed in the clamshell part 300 is not formed to be completely shielded by a pin through-hole 335 formed to be inserted by a pressure terminal pin 220 of the filter 200 to be described later.

Meanwhile, as illustrated in FIGS. 3 and 4, the strip line connector 310 may include a first contact panel 311 being contact-fixed horizontally to the other surface of the PBA 130, a second contact panel 312 disposed in parallel to the first contact panel 311 so as to be in contact with the filters 200, and a connection panel 313 configured to connect ends of the first contact panel 311 and the second contact panel 312 with each other.

The first contact panel 311, the second contact panel 312, and the connection panel 313 may form an integral conductive metal plate, and the first contact panel 311 and the second contact panel 312 may be formed to be orthogonally bent in the same direction on one side or on the other side based on the connection panel 313 disposed in a separation direction of the PBA 130 and the filters 200. However, it is not always necessary that the first contact panel 311 and the second contact panel 312 are orthogonally bent with respect to the connection panel 313, and the respective connection parts may be provided to be rounded and connected, so that they can be elastically deformed in an effective manner as compared with a case where they can be provided with a pressing force from a pressure terminal pin 220.

More specifically, as illustrated in FIGS. 3 and 4, the strip line connector 310 may be provided so that the first contact panel 311 is provided in parallel with respect to the other surface of the PBA 130 so that the first contact panel 311 comes in surface contact with the contact part 135 provided on the other surface of the PBA 130, and the second contact panel 312 is provided in parallel to the first contact panel so that the second contact panel 312 is disposed to be spaced apart for a predetermined distance from the first contact panel 311 in the separation direction, and the pressure terminal pin 220 of the filter 200 to be described later moves in the separation direction and presses the second contact panel 312, and the connection panel 313 connects one end of the first contact panel 311 and one end of the second contact panel 312 with each other or connects the other end of the first contact panel 311 and the other end of the second contact panel 312 with each other. In addition, the strip line connector 310 may be formed to be elastically deformable by pressing of the pressure terminal pin 220 to be described later. As described above, the strip line connector 310 may absorb an assembly tolerance between the PBA 130 and the clamshell part 300 by being elastically deformed by the pressure terminal pin 220.

Meanwhile, the filter 200 may further include the pressure terminal pin 220 having an end part that presses and contacts the second contact panel 312 while penetrating the pin through-hole 335 formed on the other side so that a part of the signal line connection space 305 is opened when the filter 200 is closely coupled to one surface of the clamshell part 300 while generating a predetermined adhesion.

As illustrated in FIGS. 3 and 4, the pressure terminal pin 220 may have one end configured to press the second contact panel 312 among the constitutions of the strip line connector 310 through penetration of the pin through-hole 335 that communicates with the signal line connection space 305, and the other end configured to be pressed by a press-fit boss 211 integrally formed with the contact part 210 of the filter 200 and to be mounted on and fixed to the contact part 210 of the filter 200 at the same time in a soldering joining method.

In the antenna device according to an embodiment of the present disclosure, it is exemplified that the pressure terminal pin 220 is separately manufactured and joins the filter 200. However, it is not always necessary that the pressure terminal pin 220 is separately manufactured, and it is also possible that the pressure terminal pin 220 is integrally formed with the contact part 210 of the filter 200.

If the filter 200 comes in close contact with the clamshell part 300 by generating a predetermined adhesion on the other side of the clamshell part 300, the pressure terminal pin 220 presses and deforms the second contact panel 312 of the strip line connector 310, so that the assembly tolerance between the clamshell part 300 and the filters 200 is easily absorbed, and the above-described electrical signal lines are constructed.

Meanwhile, on the surface that comes in close contact with the filter 200 among the outer side surface of the clamshell part 300, an elastic ground washer 320, which electrostatically shields the electrical signal lines and is elastically supported by the filters 200, may be further provided.

The elastic ground washer 320 is fixed to the outer side surface of the clamshell part 300, and serves as a substantial ground terminal in a manner that the elastic ground washer is energized with the film of the signal shielding material that forms the above-described ground surface 307, and the front end part thereof elastically supports an elastic support groove 235 provided on the filter 200 so as to surround the periphery of the electrical signal line.

Accordingly, the signal line connection space 305 constructs the electrical signal line via the strip line connector 310 connecting between the PBA 130 and the filter 200, which are main constitutions for frequency filtering of a specific band, and at the same time, can prevent the impedance characteristics of the signal line connection space 305 from being easily disrupted by preventing a signal inflow from an outside and leakage of an internal signal by means of the region coated by the signal shielding material, such as the ground surface 307 and the elastic ground washer 320.

Figure 2:
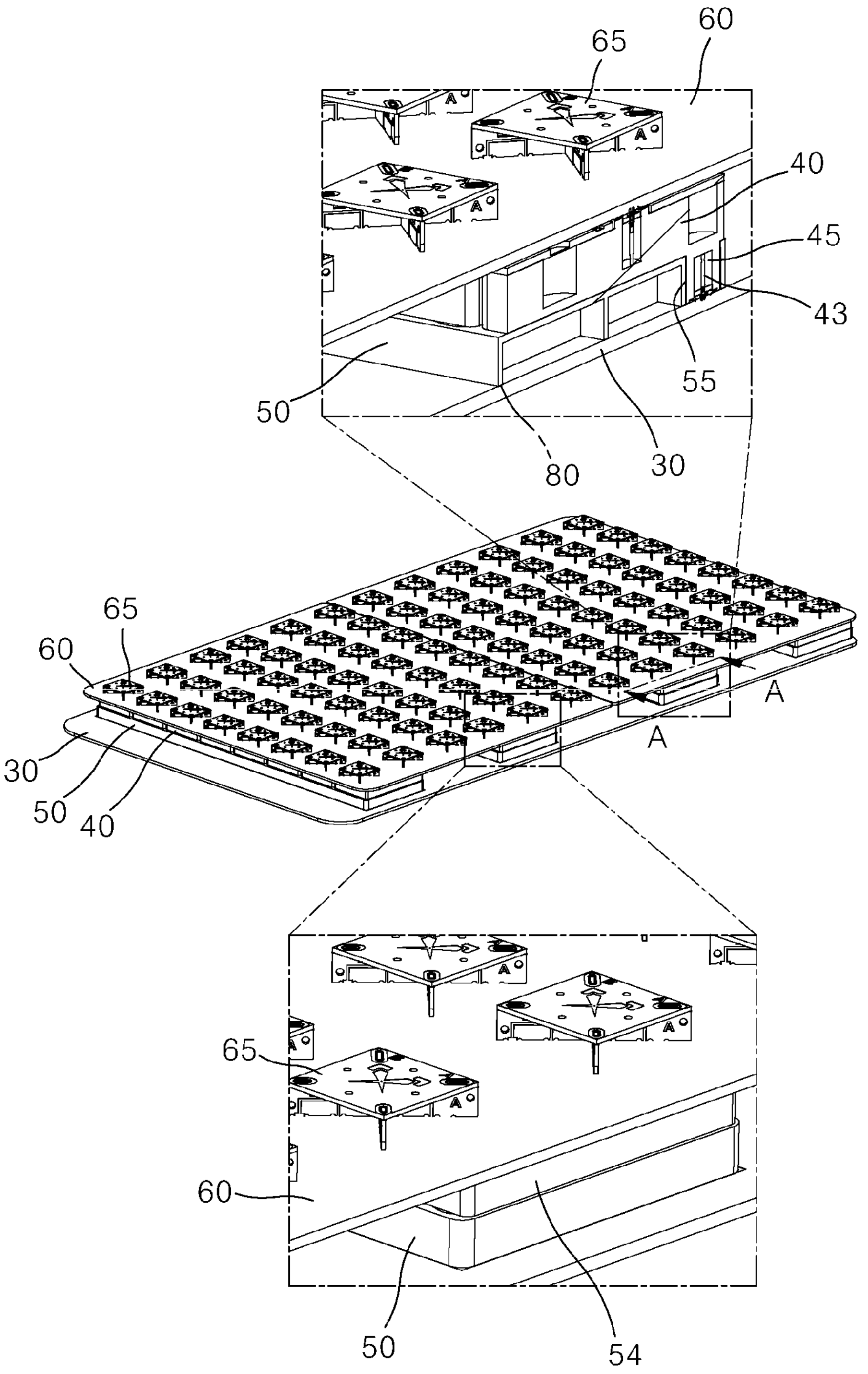
FIG. 2 is a perspective view and a partial cross-sectional view illustrating a filter assembly between a related PCB board and an antenna substrate among the constitutions of FIG. 1.

Further, since the electrical signal line can be constructed by using the strip line connector 310, which is a very simple structure, even without the complicated and expensive component, such as the RF connector (refer to reference numeral 43 of FIG. 2) in the related art as illustrated in FIG. 2, and a part of the RF connector 43 can be deleted from the filter 200, the manufacturing cost of the single filter 200 can be reduced.

Figure 5:
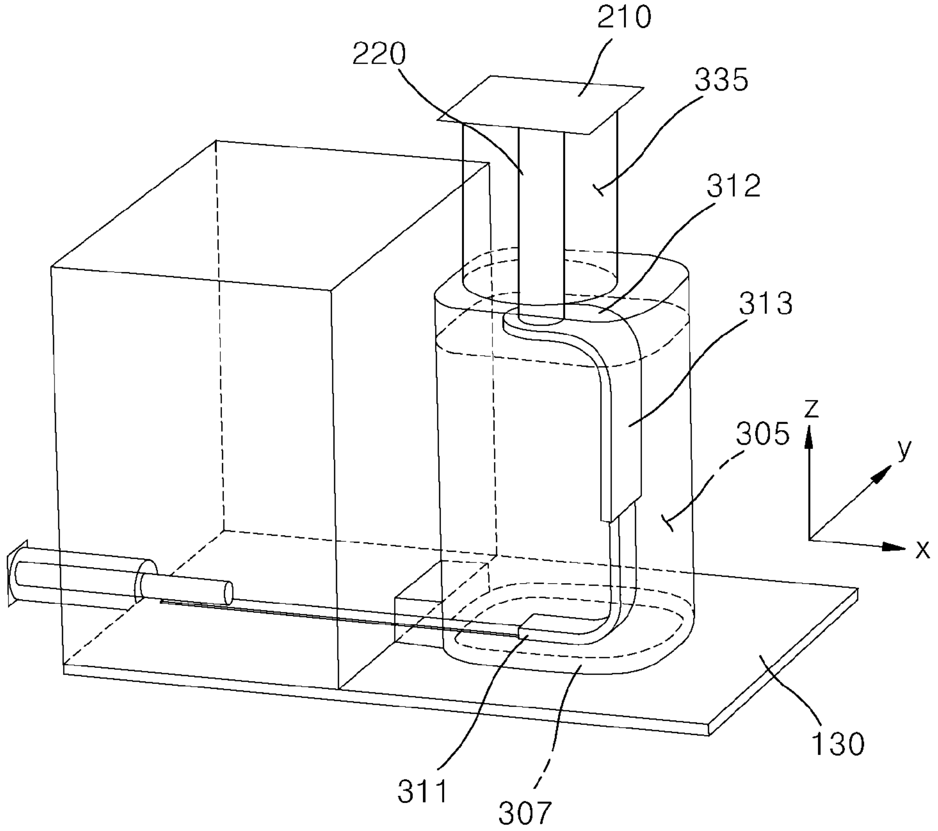
FIG. 5 is a schematic diagram explaining the result of a return loss depending on a surface contact state of a strip line connector among the constitutions of FIG. 3.

FIG. 5 is a schematic diagram explaining the result of a return loss depending on a surface contact state of a strip line connector among the constitutions of FIG. 3, and FIGS. 6A to 6D are graphs of frequency characteristics in accordance with a certain amount of frequency offset in X-axis direction and/or Y-axis direction. FIG. 7 is a schematic diagram explaining the result of a return loss in a state where a strip line connector among the constitutions of FIG. 3 is floated for a predetermined length from the other surface of a PBA, and FIGS. 8A to 8D are graphs of frequency characteristics in accordance with a certain amount of frequency offset in X-axis direction and/or Y-axis direction.

FIG. 5 is a schematic diagram introduced to explain the result of the return loss depending on the surface contact state of the strip line connector 310, and FIGS. 6A to 6D illustrate the experimental resultant values of the frequency characteristics in a normal contact state (refer to FIG. 6A), in case of the frequency offset of 0.3 mm in X-axis direction (refer to FIG. 6B), in case of the frequency offset in Y-axis direction (refer to FIG. 6C), and in case of the frequency offset of 0.3 mm in X-axis and Y-axis directions, respectively, in respective 3 GHz frequency bands.

Figure 6A:
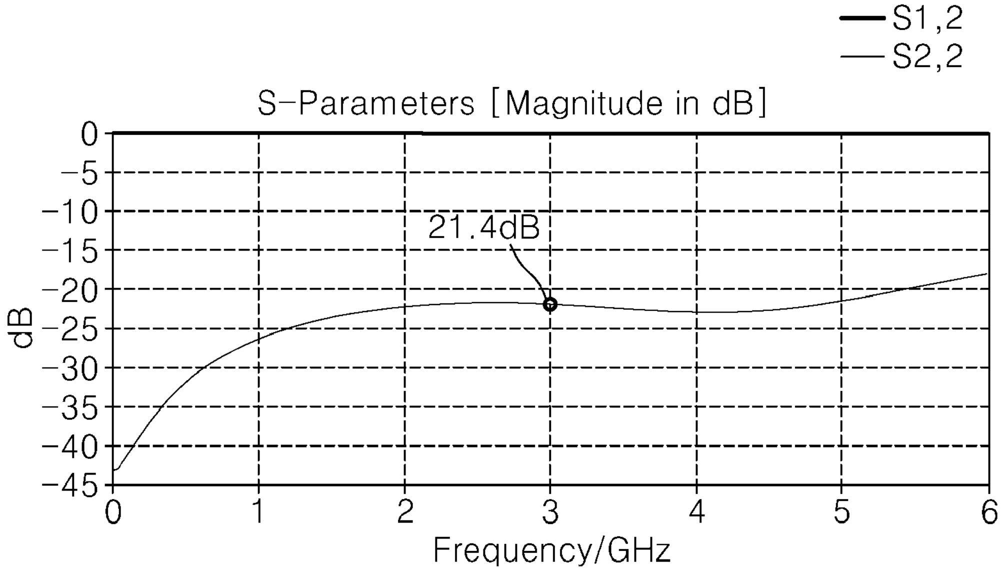
FIGS. 6A to 6D are graphs of frequency characteristics in accordance with a certain amount of frequency offset in X-axis direction and/or Y-axis direction.
Figure 6B:
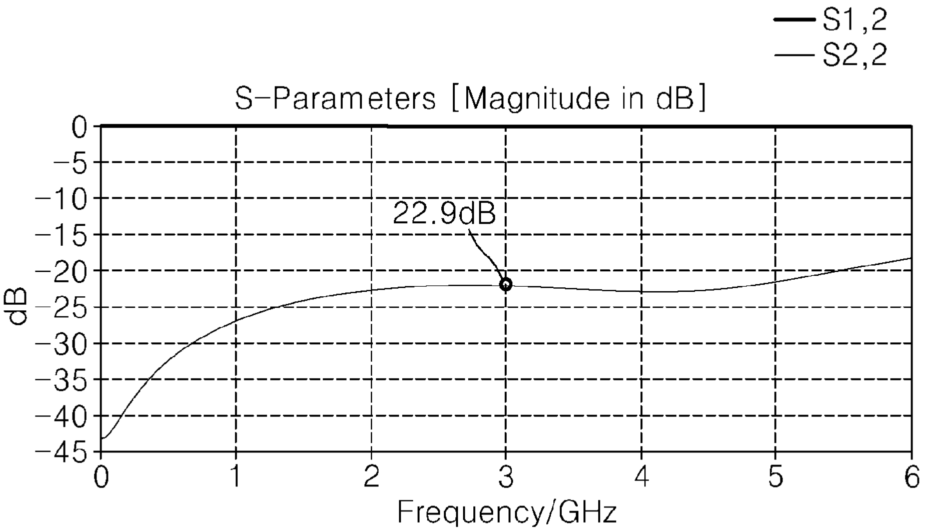
Figure 6C:
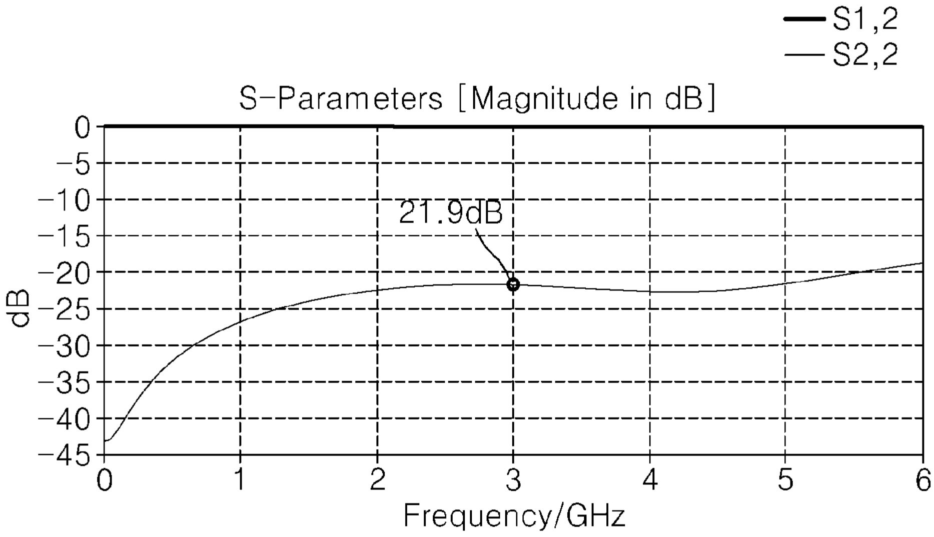
Figure 6D:
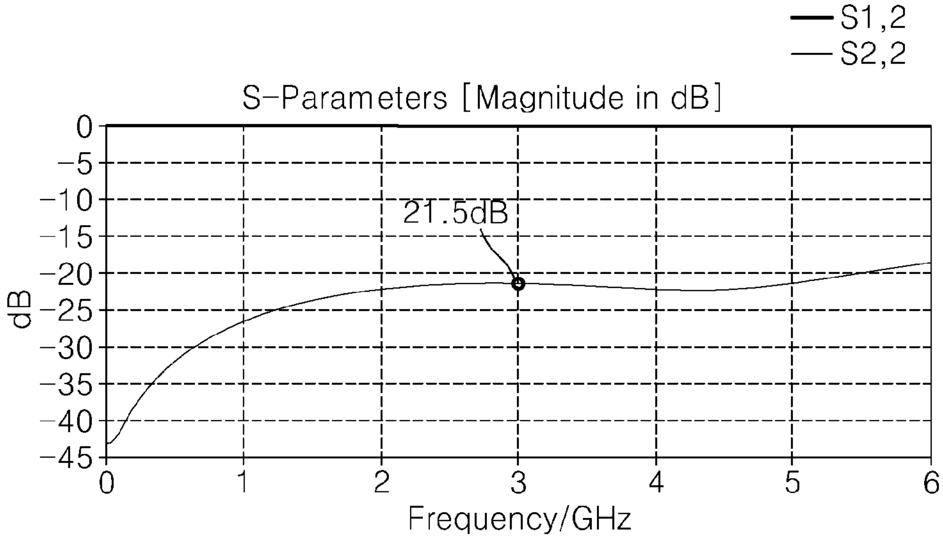
Figure 7:
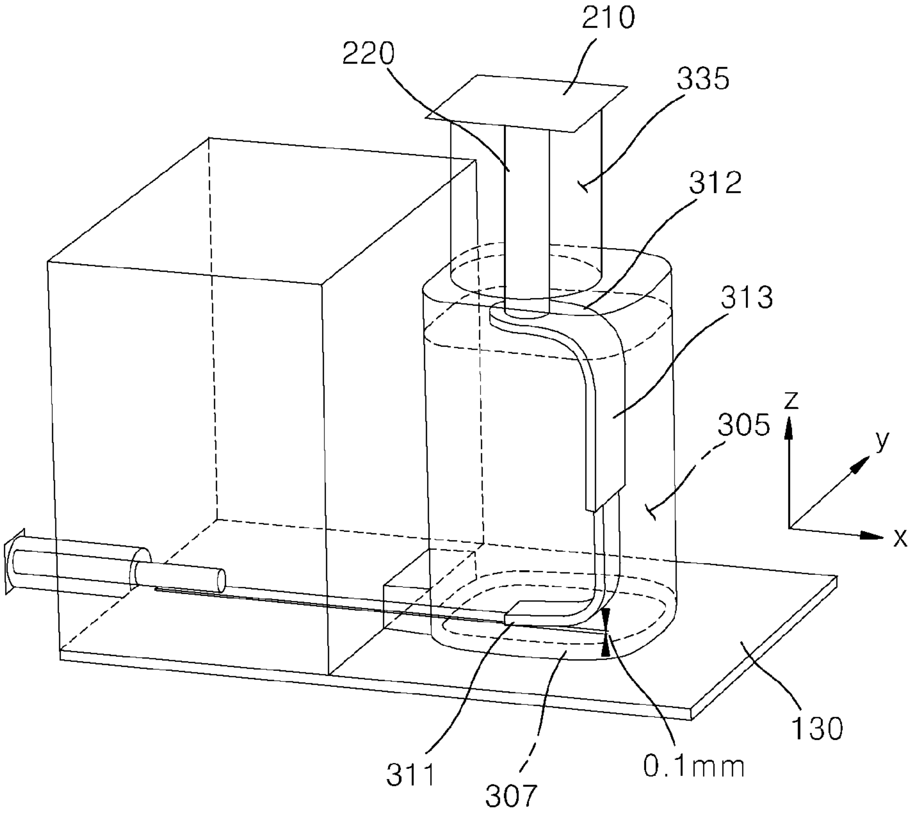
FIG. 7 is a schematic diagram explaining the result of a return loss in a state where a strip line connector among the constitutions of FIG. 3 is floated for a predetermined length from the other surface of a PBA.

In case of the normal contact of the strip line connector 310, as illustrated in FIG. 6A, it can be known that a return loss of 21.4 dB occurs in the 3 GHz frequency band, and in case of the frequency offset of 0.3 mm in the X-axis direction, as illustrated in FIG. 6B, a return loss of 22.9 dB occurs in the 3 GHz frequency band. In case of the frequency offset of 0.3 mm in the Y-axis direction, as illustrated in FIG. 6C, it can be known that a return loss of 21.9 dB occurs in the 3 GHz frequency band, and in case of the frequency offset of 0.3 mm in the X-axis and Y-axis directions, as illustrated in FIG. 6D, a return loss of 21.5 dB occurs in the 3 GHz frequency band.

Through this, in order to secure the minimum return loss, it is preferable that the strip line connector 310 is installed to come in normal surface contact without being offset in the X-axis and Y-axis directions. Further, it can be known that the return loss in the range of 0.3 mm in the X-axis and Y-axis direction, which is the assembly tolerance range of the strip line connector, is a loss within the tolerance range.

Meanwhile, FIG. 7 is a schematic diagram explaining the result of a return loss in a state where a strip line connector 310 is floated for a predetermined length (i.e., in a state where the contact surface is inclined) from the other surface of a PBA 130 in the Z-axis direction, and FIGS. 8A to 8D illustrate the experimental resultant values of the frequency characteristics in a normal state (refer to FIG. 8A) where the strip line connector 310 is floated by 0.1 mm in the Z-axis direction, in case of the frequency offset of 0.3 mm in the X-axis direction (refer to FIG. 8B), in case of the frequency offset in the Y-axis direction (refer to FIG. 8C), in case of the frequency offset of 0.3 mm in X-axis and Y-axis directions, respectively, in the respective 3 GHz frequency bands.

Figure 8A:
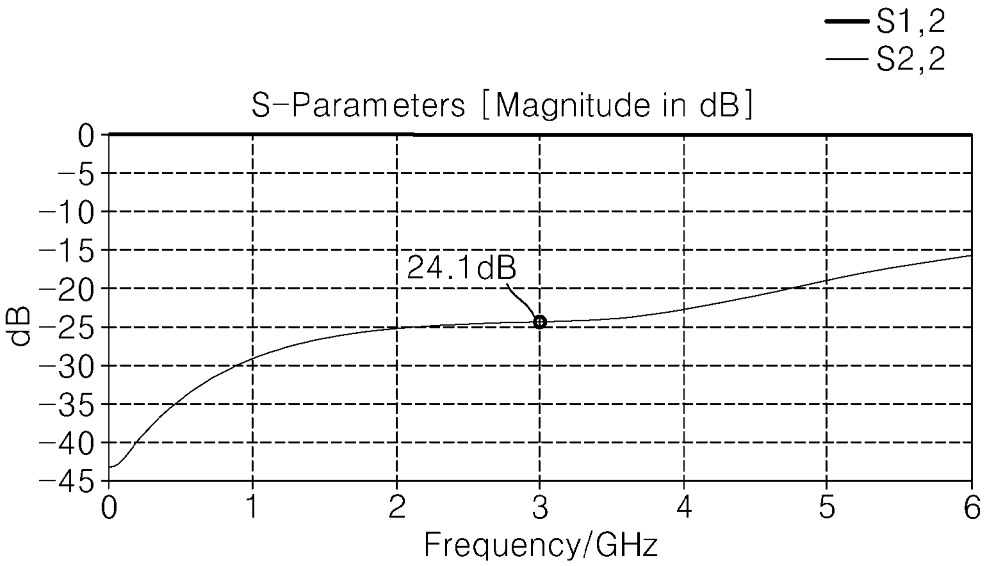
FIGS. 8A to 8D are graphs of frequency characteristics in accordance with a certain amount of frequency offset in X-axis direction and/or Y-axis direction.
Figure 8B:
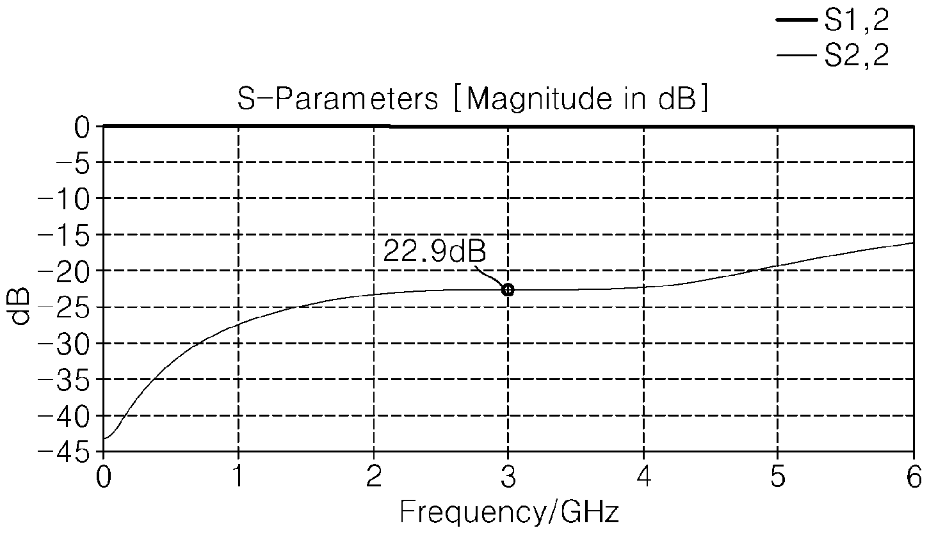
Figure 8C:
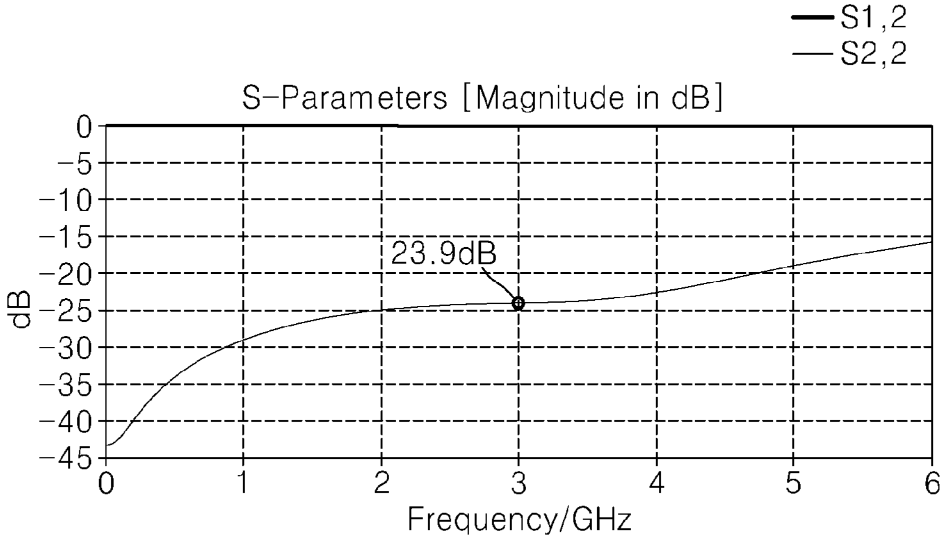
Figure 8D:
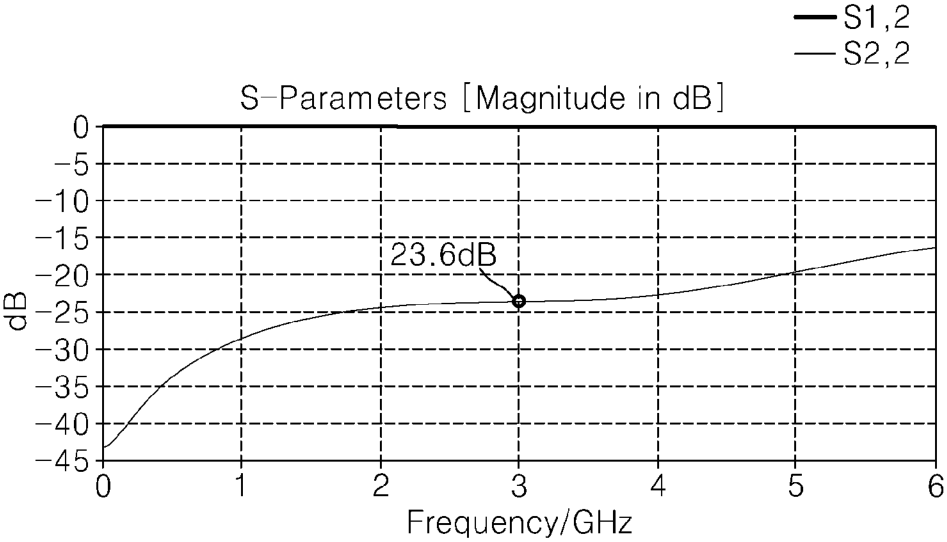

In case of the normal state where the strip line connector 310 is floated by 0.1 mm in the Z-axis direction from the other surface of the PBA 130, as illustrated in FIG. 8A, it can be known that a return loss of 21.1 dB occurs in the 3 GHz frequency band, and in case of the frequency offset of 0.3 mm in the X-axis direction, as illustrated in FIG. 8B, a return loss of 22.9 dB occurs in the 3 GHz frequency band. In case of the frequency offset of 0.3 mm in the Y-axis direction, as illustrated in FIG. 8C, it can be known that a return loss of 23.9 dB occurs in the 3 GHz frequency band, and in case of the frequency offset of 0.3 mm in the X-axis and Y-axis directions, as illustrated in FIG. 8D, a return loss of 23.6 dB occurs in the 3 GHz frequency band.

Here, in case of the contact in a predetermined slope with respect to the contact part 135 on the side of the PBA 130 of the strip line connector 310 and the contact part on the side of the filter 200, it is measured that a more return loss occurs as compared with the other case (i.e., case of FIG. 5), but it can be confirmed that this loss is the loss within the tolerance.

Further, in case that the strip line connector 310 is floated for a predetermined length from the PBA 130, it is more preferable that the strip line connector 310 is designed so as to be offset in the X-axis and Y-axis directions in order to secure the minimum return loss, but as described above, it can be confirmed that joining of the strip line connector 310 in the surface contact state with the other surface of the PBA 130 is the most preferable design direction.

As described above, the antenna device according to an embodiment of the present disclosure has the advantages that the impedance characteristics can be prevented from being easily disrupted and the manufacturing cost of the produce can be greatly reduced through reduction of the number of the RF connectors in constructing a predetermined electrical signal lines penetrating the clamshell part 300 by using the strip line connector 310 having the very simple elastic structure.

As above, an antenna device according to an embodiment of the present disclosure has been described in detail. However, embodiments of the present disclosure are not necessarily limited to the above-described embodiment, but it will be apparent that various modifications and implementation within an equal scope are possible by those of ordinary skill in the art to which the present disclosure pertains. Accordingly, the true scope of the present disclosure should be interpreted by the appended claims.

INDUSTRIAL APPLICABILITY

The present disclosure provides an antenna device which can simplify the constitution of a filter by providing a strip line connector inside a clamshell part instead of installing an RF connector in the filter.

The invention claimed is:

1. An antenna device comprising:

a printed board assembly (hereinafter, abbreviated to "PBA") having one surface on which a plurality of antenna-related components are mounted and the other surface on which a plurality of filters are mounted;

an antenna board disposed to be stacked on one surface side of the PBA, mounted with a plurality of antenna elements on one surface of the antenna board, and connected to construct electrical signal lines with the filters in close contact with the other surface of the antenna board;

a clamshell part interposed between the other surface of the PBA and one surface of the filters and configured to perform a signal shielding function; and a strip line connector disposed inside the clamshell part, configured to absorb an assembly tolerance between the clamshell parts while being partially deformed by means of an adhesion of the filters during close coupling of the filters, and configured to construct the electrical signal lines.

2. The antenna device of claim 1, wherein the strip line connector is connected to the other surface of the PBA so as to be grounded by the ground surface provided in a form in which a signal shielding material is coated on an inner surface of the clamshell part and the other surface of the PBA.

3. The antenna device of claim 1, wherein the strip line connector is provided on the clamshell part, and wherein one side thereof is shielded by the PBA, and the other side thereof is provided in a signal line connection space that is shielded by the filters.

4. The antenna device of claim 3, wherein a signal shielding material is provided to be coated on an inner wall surface of the signal line connection space so as not to be energized with the strip line connector.

5. The antenna device of claim 4, wherein the signal shielding material coated on the inner wall surface of the signal line connection space is configured to serve as a ground around the strip line connector.

6. The antenna device of claim 3, wherein the strip line connector comprises:

a first contact panel being contact-fixed horizontally to the other surface of the PBA;

a second contact panel disposed in parallel to the first contact panel so as to be in contact with the filters; and a connection panel configured to connect ends of the first contact panel and the second contact panel with each other.

7. The antenna device of claim 6, wherein the strip line connector is made of a conductive material, and is formed to be elastically deformable.

8. The antenna device of claim 6, wherein a pin through-hole that communicates with the signal line connection space is formed on a region that is in close contact with the filters on the clamshell part, and wherein an end part of a pressure terminal pin that is in pressure contact with the second contact panel on the strip line connector is fixed to the filters while penetrating the pin through-hole.

9. The antenna device of claim 8, wherein the pressure terminal pin is fixedly mounted on a contact surface of the filters in a soldering joining method.

10. The antenna device of claim 1, wherein an elastic ground washer electrostatically shielding the electrical signal line and being elastically supported by the filter is installed on one outer side surface of the clamshell part that comes in close contact with the filter.

* * * * *